Patented Dec. 27, 1949

2,492,659

UNITED STATES PATENT OFFICE 2,492,659

ALKYLTHIENYLSODIUM PRODUCTION

John W. Schick, Camden, N. J., assignor to Socony-Vacuum Oil Company, Incorporated, a corporation of New York No Drawing. Application November 9, 1946, Serial No. 708,944

8 Claims. (Cl. 260—329)

This invention relates to a process for the metalation of alkylthiophenes and, more particularly, is concerned with a method for preparing alkylated thienylsodium compounds.

One widely employed method for preparing inorganic salts is by the interaction of an acid with a metal. In a similar manner, salts can be prepared from the action of a metal on an organic compound containing one or more acidic hydrogen atoms. Such reactions involving replacement of an acidic hydrogen by a metal atom to yield an organo-metallic compound illustrate transformations generally referred to as metalation.

In most instances direct metalation of an organic compound with a metal is extremely difficult, if not impossible, to attain. Thus, alkylthiophenes cannot be metalated directly with sodium. In order to overcome the difficulties accompanying direct metalation and to permit the reaction to proceed, it has heretofore been considered essential in metalating alkylthiophenes to carry out the reaction in the presence of organo-mercury compounds. Such methods, however, have been accompanied by certain inherent disadvantages, foremost of which is that involving the preliminary preparation and use of expensive organo-mercury compounds. The metalation procedures using said compounds, moreover, while being the best heretofore available, have not generally been satisfactory. Thus, the yields of resulting alkylthienylsodium compounds have been small despite the relatively high reaction temperatures employed and the excessively long reaction periods of the order of days. It is readily apparent that these methods do not lend themselves to an efficient production of metalated alkylthiophenes in commercial quantities.

It has now been discovered that alkylthiophenes can be metalated in an efficient manner by contacting the same with an organic halide in the presence of sodium under particular conditions hereinafter described in detail to yield an alkylthienylsodium. It has been found that by carrying out the reaction in the presence of an organic halide, the above-mentioned difficulties encountered in the metalation of alkylthiophenes have been largely overcome. Thus, the process of the present invention can be carried out as a one-step method in which all reactants are combined at one time, and the heretofore necessity of preparing expensive organo-mercury compounds for use in the metalation reaction can be eliminated. Moreover, the desired metalated alkylthiophenes are obtained in accordance with the process described herein in substantially higher yields than those heretofore obtained without necessitating the excessively long reaction periods required by the previously employed methods.

In accordance with the process of this invention, metalated alkylthiophenes are prepared by the interaction of an alkylthiophene, an alkyl, aralkyl or aryl halide, and sodium in the presence of an inert organic solvent to yield an alkylthienylsodium. Any of the commonly employed organic solvents which are inert to sodium may be used in the present process. Preferred solvents include alkyl ethers, dialkyl ethers of glycols, and hydrocarbons such as benzene, hexane, and the like.

The function of the alkyl, aralkyl or aryl halide in the metalation reaction of this invention appears to lie in the intermediate formation of the corresponding alkyl, aralkyl or arylsodium as a result of the reaction with sodium, said organosodium, in turn, serving as a metalating agent to yield a product of alkylthienylsodium. Any of the alkyl, aralkyl or aryl halides commonly employed in preparing organic salts may accordingly be used in the process of this invention. Usually, however, for economic reasons, the shorter chain alkyl halides, such as ethyl chloride, propyl chloride, butyl chloride, and easily obtainable aryl halides, such as chlorobenzene, bromobenzene, chlorotoluenes, brom-naphthalenes, and the like will be employed.

Alkylthiophenes generally may be metalated in accordance with the process described herein, it being only necessary that at least one acidic hydrogen atom attached directly to a carbon atom which is a member of the thiophene ring be available for replacement by the metal atom. Generally the replaceable hydrogen atom will be one located in the alpha position of the thiophene ring unless these positions are occupied by other groups. It will thus be understood that the present invention contemplates the metalation of monoalkyl, dialkyl, and trialkylthiophenes. These compounds will be referred to throughout the specification and claims as alkylthiophenes.

Due to the high reactivity of sodium and the resultant alkylthienylsodium, it is essential to exclude moisture and air from the reaction zone and to carry out the process of this invention in an inert atmosphere, such as nitrogen or other of the inert gases. If the solvent employed is one of low boiling point, such as diethyl ether, the vapor of said solvent may provide the inert atmosphere under which the reaction takes place.

Initial contact between the reactants is preferably made at a fairly low temperature of the order of 0 to 10° C. After the reactants are brought into contact, the metalation reaction proceeds. Since the rate of this reaction is dependent on the temperature, increasing with increasing temperatures, the process will usually be carried out at a higher temperature. It has been found, however, that at temperatures above the melting point of sodium the yield of desired product is drastically reduced, due presumably to fusion of the sodium. The melting point of sodium under the particular reaction conditions employed accordingly will constitute the upper temperature limit under which metalation is effected in accordance with the present invention. The reaction will be conveniently carried out at the reflux temperature of the inert organic solvent used, provided, of course, that said temperature does not exceed the melting point of sodium. The reaction may, if desired, be carried out under pressure, although ordinarily the process proceeds readily at atmospheric pressure.

The unique metalation reaction of the present invention appears to be confined to the use of sodium as the metalating agent. Sodium may be introduced into the reaction mixture as metallic sodium or in the form of an alloy containing sodium in substantial proportion, preferably as its major component. A particularly effective means for introducing sodium into the reaction mixture is from a sodium amalgam. The use of a sodium amalgam has generally been found to give higher yields of the desired alkylthienylsodium compound than the use of metallic sodium. It is believed that this increased yield of product is due primarily to the fact that sodium in the form of an amalgam is in an extremely finely subdivided state, presenting an increased reaction surface. In general, it may be stated that the reaction rate, and consequently the yield of desired product obtained in a given time, is dependent on the particle size of the sodium employed for the metalation. As a rule, the smaller the particle size of sodium used, the faster was the rate of reaction. Accordingly, finely divided sodium, such as sodium amalgam, sodium shot or sodium sand, is to be preferred for use in the present process. A convenient method of preparing finely divided sodium for use in the present invention comprised melting the sodium at the reflux temperature of anhydrous toluene in an atmosphere of nitrogen and then cooling rapidly with high speed stirring. The toluene was then replaced with the inert organic solvent employed, and the sodium particles so obtained were used in effecting metalation. Likewise, any other means of finely dividing the sodium metal may be employed.

The various reactants used in metalating thiophene in accordance with the process of this invention may be contacted in a number of ways. Thus, the organic halide may be added to a solvent mixture of alkylthiophene and finely divided sodium. The organic halide may be either added to the mixture of alkylthiophene and sodium as a liquid or, if it is gaseous at the particular temperature employed, it may be bubbled into the mixture. A modification which has been found to be particularly adaptable in using the present invention comprises adding a solvent solution of the organic halide, cooled to a temperature below its boiling point, to a solvent solution of thiophene and finely divided sodium. However, the present invention contemplates other modifications and order of addition of the reactants, as will be understood by those skilled in the art.

The compound resulting from the process of this invention, namely, an alkylthienylsodium having, in addition to an alkyl group, a strongly electro-positive atom attached to the thiophene ring is useful as an intermediate in the synthesis of derivatives of thiophene which, in turn, find use in the manufacture of plastics, pharmaceuticals, dyes, addition agents for petroleum fractions, odorants, synthetic lubricants, waxes, extreme pressure additives for mineral oil, insecticides, and anti-foaming agents. The alkylthienylsodium compounds produced in accordance with the method disclosed herein may thus be subjected to sulfonation, carbonation, halogenation, acylation, alkylation, hydrogenation, nitration, etc., to yield useful derivatives of thiophene. The compounds may also be coupled or condensed with other molecules by reacting with various other metals and, in general, undergo a multitude of reactions characteristic of organo-sodium compounds.

The following detailed examples will serve to illustrate the method of metalating alkylthiophenes in accordance with this invention without limiting the same.

*Example 1*

A cold mixture of 16 grams (0.25 mole) of ethyl chloride in 200 milliliters of anhydrous diethyl ether was added dropwise over a 1-hour period to a vigorously stirred mixture, cooled to a temperature of 5–10° C., of 49 grams (0.5 mole) of 2-methylthiophene, 100 milliliters of anhydrous diethyl ether, and 12 grams (0.5 gram atom) of freshly prepared sodium sand. The reaction mixture was maintained under an atmosphere of nitrogen and during the addition was cooled by an ice bath. After the addition of ethyl chloride was completed, the ice bath was removed and the reaction mixture was stirred for an additional 2 hours at room temperature. The product resulting from said reaction was identified as 5-methyl-2-thienylsodium.

Such identification was effected by carbonating the product by addition thereto of small pieces of freshly crushed Dry Ice. The temperature rose momentarily but was kept below 30° C. by immersing the reaction vessel in an ice bath. Two hundred milliliters of distilled water were added cautiously to destroy the small amount of unreacted sodium. The resulting aqueous layer was separated and acidified with 70 milliliters of concentrated hydrochloric acid to yield 24 grams (70 per cent yield) of crude 5-methyl-2-thiophenecarboxylic acid. This material, upon decolorization with charcoal and recrystallization from benzene, gave a product having a melting point of 137–138.5° C. A mixed melting point of this product with an authentic sample of 5-methyl-2-thiophenecarboxylic acid gave no depression.

*Example 2*

A cold mixture of 16 grams (0.25 mole) of ethyl chloride in 200 milliliters of anhydrous diethyl ether was added dropwise over a 1-hour period to a vigorously stirred mixture, cooled to a temperature of 5–10° C., of 49 grams (0.5 mole) of 3-methylthiophene, 100 milliliters of anhydrous diethyl ether, and 15 grams (0.65 gram atom) of freshly prepared sodium sand. The reaction mixture was maintained under an atmosphere of nitrogen and during the addition of ethyl chloride was cooled by an ice bath. After the addition was completed, the ice bath was removed and the reaction mixture was stirred for an additional hour, during which time the temperature rose to the reflux temperature of the ether. The product resulting from said reaction was identified as 4-methyl-2-thienylsodium.

Such identification was effected by carbonating the product by addition thereto of small pieces of freshly crushed Dry Ice. The temperature rose momentarily but decreased rapidly on the continued addition of Dry Ice. The unreacted sodium was destroyed with 50 milliliters of ethanol, after which 200 milliliters of distilled water were cautiously added. The resulting aqueous layer was separated and acidified with 75 milliliters of concentrated hydrochloric acid to yield 15 grams (42 per cent yield) of a pale-yellow precipitate. The material so obtained, upon recrystallization from water, gave a product having a melting point of 117–119° C. A mixed melting point of this product with an authentic sample of 4-methyl-2-thiophenecarboxylic acid gave no depression.

*Example 3*

A cold mixture of 16 grams (0.25 mole) of ethyl chloride in 200 milliliters of anhydrous diethyl ether was added dropwise over a 1-hour period to a mixture, cooled to a temperature of 5–10° C., of 40 grams of 2-tertiary-butylthiophene, 100 milliliters of anhydrous diethyl ether, and 15 grams (0.65 gram atom) of freshly prepared sodium sand. The reaction mixture was maintained under an atmosphere of nitrogen and during the addition was cooled by an ice bath. After the addition of ethyl chloride was completed, the ice bath was removed and the reaction mixture stirred for an additional 2 hours, during which time the temperature rose to the reflux temperature of the ether. The product resulting from said reaction was identified as 5-tertiary-butyl-2-thienylsodium.

Such identification was effected, as in Example 2, by carbonating the product to yield 39 grams (85 per cent yield) of 5-tertiary-butyl-2-thiophenecarboxylic acid, which was a white crystalline product having a melting point of 124–125° C. and a neutral equivalent of 186, the calculated neutral equivalent being 184.

*Example 4*

A cold mixture of 34 grams (0.25 mole) of normal butyl bromide in 200 milliliters of anhydrous diethyl ether was added dropwise over a 1-hour period to a vigorously stirred mixture, cooled to a temperature of 5–10° C., of 49 grams (0.5 mole) of 2-methylthiophene, 100 milliliters of anhydrous diethyl ether, and 15 grams (0.65 gram atom) of freshly prepared sodium sand. The addition of butyl bromide was carried out as in the previous examples and after the addition was completed, the reaction was refluxed for 3½ hours. The product resulting from said reaction was identified as 5-methyl-2-thienylsodium.

Such identification was effected, as in Example 2, by carbonating the product to yield 10 grams (30 per cent yield) of 5-methyl-2-thiophenecarboxylic acid having a melting point of 137–138.5° C. The mixed melting point of this product with an authentic sample of 5-methyl-2-thiophenecarboxylic acid gave no depression.

*Example 5*

A cold mixture of 16 grams (0.25 mole) of ethyl chloride in 200 milliliters of anhydrous diethyl ether was added dropwise over a period of 75 minutes to a mixture, cooled to a temperature of 5–10° C., of 100 milliliters of anhydrous diethyl ether, 39 grams (0.25 mole) of 2-tertiary-amyl-thiophene and sodium amalgam sand containing 15 grams (0.65 gram atom) of sodium and 12.5 grams (0.062 gram atom) of mercury. The reaction was maintained under an atmosphere of nitrogen and during the addition was cooled by an ice bath. After the addition of reactants was completed, the ice bath was removed and the mixture was warmed to reflux for 2 hours. The product resulting from said reaction was identified as 5-tertiary-amyl-2-thienylsodium.

Such identification was effected, as in Example 2, by carbonating the product to yield 23 grams (46 per cent yield) of 5-tertiary-amyl-2-thiophenecarboxylic acid which, upon recrystallization from benzene, was found to have a melting point of 87–87.5° C.

*Example 6*

A cold mixture of 16 grams (0.25 mole) of ethyl chloride in 200 milliliters of anhydrous diethyl ether was added dropwise over a period of 70 minutes to a mixture, cooled to a temperature of 5–10° C., of 100 milliliters of anhydrous diethyl ether, 49 grams (0.25 mole) 2-($\alpha, \alpha, \gamma, \gamma$-tetramethyl)butylthiophene and sodium amalgam sand containing 15 grams (0.65 gram atom) of sodium and 12 grams (0.06 gram atom) of mercury. The reaction mixture was maintained under an atmosphere of nitrogen and during the addition was cooled by an ice bath. After the addition was completed, the ice bath was removed and the temperature was observed for a period of one-half hour, during which time it remained at 35° C. The reaction mixture was warmed to reflux for an additional hour and then cooled to room temperature. The product resulting from said reaction was identified as 5-($\alpha, \alpha, \gamma, \gamma$-tetramethyl)butyl-2-thienylsodium.

Such identification was effected, as in Example 2, by carbonating the product to yield 40 grams (66 per cent yield) of 5-($\alpha, \alpha, \gamma, \gamma$-tetramethyl)-butyl-2-thiophenecarboxylic acid. The crude product, upon sublimation, yielded needle-like crystals having a melting point of 122–123.3° C. and a neutral equivalent of 242, the calculated neutral equivalent being 240.

*Example 7*

A cold mixture of 16 grams (0.25 mole) of ethyl chloride in 200 milliliters of anhydrous diethyl ether was added dropwise over a period of 1 hour to a mixture, cooled to a temperature of 5–10° C., of 100 milliliters of anhydrous diethyl ether, 47 grams (0.25 mole) of 2-($\alpha$-phenylethyl)thiophene and sodium amalgam sand containing 15 grams (0.65 gram atom) of sodium and 6 grams (0.03 gram atom) of mercury. The reaction mixture was maintained under an atmosphere of nitrogen during the addition and was cooled by an ice bath. After the addition was completed, the ice bath was removed and the reaction mixture was warmed to a reflux temperature for 2 hours and then cooled to room temperature. The product resulting from said reaction was identified as 5-($\alpha$-phenylethyl)-2-thienylsodium.

Such identification was effected, as in Example 2, by carbonating the product to yield 35 grams (60 per cent yield) of 5-($\alpha$-phenylethyl)-2-thiophenecarboxylic acid which, upon recrystallization from water, had a melting point of 99.5–

Example 8

A mixture of 120 grams (0.76 mole) of bromobenzene in 700 milliliters of benzene was added dropwise over a period of 2 hours to a warm mixture, maintained at a temperature of 40° C., of 300 milliliters of benzene, 98 grams (1.0 mole) of 2-methylthiophene and sodium amalgam sand containing 35 grams (1.52 gram atoms) of sodium and 20 grams (0.10 gram atom) of mercury. As the addition of bromobenzene was continued, the temperature rose to the reflux temperature of benzene. After the reaction was completed, the reaction mixture was stirred at the same temperature for 2 hours. The product resulting from said reaction was identified as 5-methyl-2-thienylsodium.

Such identification was effected by carbonating the product by the addition thereto of small pieces of freshly crushed Dry Ice. The unreacted sodium was destroyed with 100 milliliters of ethanol, and 400 milliliters of distilled water were then cautiously added. The resulting aqueous layer was separated and acidified with 170 milliliters of concentrated hydrochloric acid to yield 67 grams (63 per cent yield) of 5-methyl-2-thiophenecarboxylic acid which, upon recrystallization from hot water, had a melting point of 137° C.

I claim:

1. A method for metalating alkylthiophenes containing at least one replaceable nuclear hydrogen atom on the thiophene ring, which comprises contacting the same with an organic halide selected from the group consisting of alkyl, aralkyl, and aryl halides in the presence of an inert organic solvent and finely divided sodium, maintaining the reaction mixture under an inert atmosphere at a temperature below the melting point of sodium, thereby effecting replacement of a nuclear hydrogen atom of the thiophene ring with sodium, to yield a resulting product of alkylthienylsodium.

2. A method for metalating alkylthiophenes containing at least one replaceable nuclear hydrogen atom on the thiophene ring, which comprises contacting the same with an organic halide selected from the group consisting of alkyl, aralkyl, and aryl halides in the presence of an inert organic solvent and sodium amalgam, maintaining the reaction mixture under an inert atmosphere at a temperature below the melting point of sodium, thereby effecting replacement of a nuclear hydrogen atom of the thiophene ring with sodium, to yield a resulting product of alkylthienylsodium.

3. A method for metalating alkylthiophenes containing at least one replaceable nuclear hydrogen atom on the thiophene ring, which comprises contacting the same with an organic halide selected from the group consisting of alkyl, aralkyl, and aryl halides in the presence of diethyl ether and finely divided sodium, maintaining the reaction mixture under an inert atmosphere at a temperature below the melting point of sodium, thereby effecting replacement of a nuclear hydrogen atom of the thiophene ring with sodium, to yield a resulting product of alkylthienylsodium.

4. A method for metalating alkylthiophenes containing at least one replaceable nuclear hydrogen atom on the thiophene ring, which comprises contacting the same with an organic halide selected from the group consisting of alkyl, aralkyl, and aryl halides in the presence of benzene and finely divided sodium, maintaining the reaction mixture under an inert atmosphere at a temperature below the melting point of sodium, thereby effecting replacement of a nuclear hydrogen atom of the thiophene ring with sodium, to yield a resulting product of alkylthienylsodium.

5. A method for metalating alkylthiophenes containing at least one replaceable nuclear hydrogen atom on the thiophene ring, which comprises contacting the same with an organic halide selected from the group consisting of alkyl, aralkyl, and aryl halides in the presence of an inert organic solvent and finely divided sodium, maintaining the reaction mixture under an inert atmosphere at the reflux temperature of said inert organic solvent but below the melting point of sodium, thereby effecting replacement of a nuclear hydrogen atom of the thiophene ring with sodium, to yield a resulting product of alkylthienylsodium.

6. A method for metalating alkylthiophenes containing at least one replaceable nuclear hydrogen atom on the thiophene ring, which comprises contacting the same with an organic halide selected from the group consisting of alkyl, aralkyl, and aryl halides in the presence of an inert organic solvent and sodium amalgam, maintaining the reaction mixture under an inert atmosphere at the reflux temperature of said inert organic solvent but below the melting point of sodium, thereby effecting replacement of a nuclear hydrogen atom of the thiophene ring with sodium, to yield a resulting product of alkylthienylsodium.

7. A method for metalating alkylthiophenes containing at least one replaceable nuclear hydrogen atom on the thiophene ring, comprising contacting the same with an alkyl halide in the presence of an inert organic solvent and finely divided sodium, maintaining the reaction mixture under an inert atmosphere at a temperature below the melting point of sodium, thereby effecting replacement of a nuclear hydrogen atom of the thiophene ring with sodium, to yield a resulting product of alkylthienylsodium.

8. A method for metalating alkylthiophenes containing at least one replaceable nuclear hydrogen atom on the thiophene ring, comprising contacting the same with an aryl halide in the presence of an inert organic solvent and finely divided sodium, maintaining the reaction mixture under an inert atmosphere at a temperature below the melting point of sodium, thereby effecting replacement of a nuclear hydrogen atom of the thiophene ring with sodium, to yield a resulting product of alkylthienylsodium.

JOHN W. SCHICK.

REFERENCES CITED

The following references are of record in the file of this patent:

UNITED STATES PATENTS

| Number | Name | Date |
|---|---|---|
| 2,163,846 | Morton | June 27, 1939 |

OTHER REFERENCES

Richter, "Organic Chemistry," pages 649–650, John Wiley, 1938.